United States Patent [19]

Blain

[11] 4,361,014
[45] Nov. 30, 1982

[54] PANEL AIR CHILLER

[75] Inventor: Edward S. Blain, Rockford, Ill.

[73] Assignee: Sundstrand Corporation, Rockford, Ill.

[21] Appl. No.: 245,477

[22] Filed: Mar. 19, 1981

[51] Int. Cl.³ .............................................. F25D 15/00
[52] U.S. Cl. ........................................ 62/237; 62/263; 62/DIG. 13
[58] Field of Search ................. 62/DIG. 13, 237, 239, 62/249, 253, 263, 248, 298, 443, 446, 447

[56] References Cited

U.S. PATENT DOCUMENTS

| | | | |
|---|---|---|---|
| 3,097,506 | 7/1963 | Blakesley, Sr. | 62/263 |
| 3,308,634 | 3/1967 | Smith | 62/263 |
| 3,545,223 | 12/1970 | Elland | 62/237 |
| 3,742,725 | 7/1973 | Berger | 62/298 X |
| 3,871,188 | 3/1975 | Vold et al. | 62/263 X |
| 3,872,686 | 3/1975 | Patrie | 62/298 X |
| 4,132,088 | 1/1979 | Grosskopf | 62/263 X |

*Primary Examiner*—Lloyd L. King

*Attorney, Agent, or Firm*—Harold A. Williamson; Ted E. Killingsworth; Michael B. McMurry

[57] ABSTRACT

This invention relates to a panel air chiller for use with a portable food storage unit. The panel air chiller includes in combination first and second spaced apart parallel panels that have thermal insulation disposed between and in contact with the panels. The thermal insulation material has formed therein at least a first and a second chamber between the panels thereby establishing passageways between the panels and through the thermal insulation material. Located in the first chamber is a means to extract heat from air passing thereover to thereby cool the air. At least one return air opening is provided through one of the panels to communicate with the portable storage unit. A fan is coupled to the space between the panels and to the first chamber to thereby draw air through the return air opening coupled to the portable storage unit. The return air so drawn moves past a means to extract heat from the air and cool the same and is thereafter delivered to and through the second chamber to at least one cool air supply opening. The cool air supply opening is adapted for coupling to the portable storage unit.

10 Claims, 6 Drawing Figures

PANEL AIR CHILLER

TECHNICAL FIELD

This invention relates to a chiller for use with a portable storage unit of the type that carries items to be cooled.

BACKGROUND ART

In the field of commerical aviation the small aircraft galleys generally use dry ice to keep food cold until used. This is expensive from a handling standpoint and unsuitable for long range operation where food must be cooled for long periods of time at temperatures below 45° F.

To solve this just noted problem a mechanical refrigeration system has been employed in some instances and involves the intallation of refrigeration cooling tubes in the galley cold compartments. In this type of system, refrigerant is circulated through the cooling tubes using a separate condensing unit. This method of cooling has proven unsatisfactory because maintenance of the refrigerant circuit must be accomplished on the aircraft thereby increasing aircraft down time.

Another approach employs the delivery of a supply of air from a self contained cooling unit or air chiller, through ducts to the cold compartments in the galley. This method of cooling, however, takes up a significant amount of valuable space in the galley to mount the cooling unit. The very nature of the cramped quarters of the galley makes it very difficult to find sufficient space for the cooling unit. Additionally, the ducting to a remote mounted air chiller is very difficult to incorporate into a small galley without significant modification to the aircraft or expensive in galley ducting. It should also be noted that ducting to a remote mounted air chiller also has significant heat absorption so that a larger cooling capacity is required.

The invention to be described more fully hereinafter is directed to a self-contained cooling unit which includes air distribution ducting and an air chiller heat exchanger sandwiched in a flat panel of solid thermally insulated foam. The air distribution ducting being fashioned by passageways through the solid foam.

DISCLOSURE OF INVENTION

This invention relates to a panel air chiller for use with a portable food storage unit. The panel air chiller includes in combination first and second spaced apart parallel panels that have thermal insulation disposed between and in contact with the panels. The thermal insulation material has formed therein at least a first and a second chamber between the panels thereby establishing passageways between the panels and through the thermal insulation material. Located in the first chamber is a means to extract heat from air passing thereover to thereby cool the air.

At least one return air opening is provided through one of the panels to communicate with the portable storage unit. A fan is coupled to the space between the panels and to the first chamber to thereby draw air through the return air opening coupled to the portable storage unit. The return air so drawn moves past a means to extract heat from the air and cool the same and is thereafter delivered to and through the second chamber to at least one cool air supply opening. The cool air supply opening is adapted for coupling to the portable storage unit.

It is therefore a primary object of this invention to provide for air distribution ducting and air chiller heat exchangers in a flat panel configuration to provide cold air for portable storage units such as food carts and galley compartments using only the space normally occupied by ducting.

Another object of the invention is to provide the panel air chiller of the primary object with a refrigerant compressor and fan assembly permanently attached to one end of the panel to make a self-contained air chiller, air distribution unit for modular installation in aircraft galleys.

Yet another object of the invention is to provide a panel air chiller assembly that can be quickly removed and replaced on an aircraft so that complete maintenance and repair can be accomplished away from the aircraft.

Still yet another object of the invention is to provide an air chiller and distribution system that reduces the air leakage potential of typical air chiller galley systems where duct connections to the air chiller are required.

A final object of the invention is to provide for a greatly reduced heat conduction loss through the galley ducts by utilizing a single panel that contains all the ducting as well as a heat exchanger integral and internally disposed within the panel.

In the attainment of the foregoing objects the invention contemplates a panel air chiller for use with a portable storage unit of the type that carries items to be cooled. The panel air chiller includes first and second spaced apart parallel panels that are separated by foam insulation material disposed between and in contact with the panels. The foam insulation material has formed therein at least a first and a second chamber between the panels. These chambers establish passages between the panels and through the thermal insulation.

The first chamber includes an evaporator heat exchanger coupled to a refrigeration unit external to the panels. Adjacent the evaporator heat exchanger is a pan to collect condensate that may form on the heat exchanger. When a sufficient volume of moisture collects on the heat exchanger, it will run off into the pan. In communication with the first chamber there is at least one return opening through one of the panels to thereby connect the portable storage unit with the first chamber.

A fan unit is coupled to the space between the panels and to the first chamber to thereby draw air through the return air opening and past the heat exchanger and to deliver air cooled by the heat exchanger to and through the second chamber to a cool air supply opening. The cool air supply opening is adapted for coupling to the portable storage unit.

The second chamber includes means in the form of tabs secured to the panels and adjustable to control distribution of cooled air to the cool air supply opening.

In addition to the structure recited in respect of the first chamber, the first chamber also includes a remote region return opening passing through the foam insulation material and between the panels to thereby return air from a remote region. The second chamber also includes a remote region air supply opening passing through the foam insulation material and between the panels to thereby deliver cooled air to the remote region.

The panel air chiller further includes a third chamber between the panels that communicates with a condenser heat exchanger having a thickness no greater than the total thickness of the spaced apart parallel panels. This third chamber is in further communication with a fan to move conditioned air over the condenser heat exchanger and discharge the same away from the panel air chiller.

Other objects and advantages of the present invention will be apparent upon reference to the accompanying description when taken in conjunction with the following drawings.

BEST MODE FOR CARRYING OUT THE INVENTION

Figure 1:
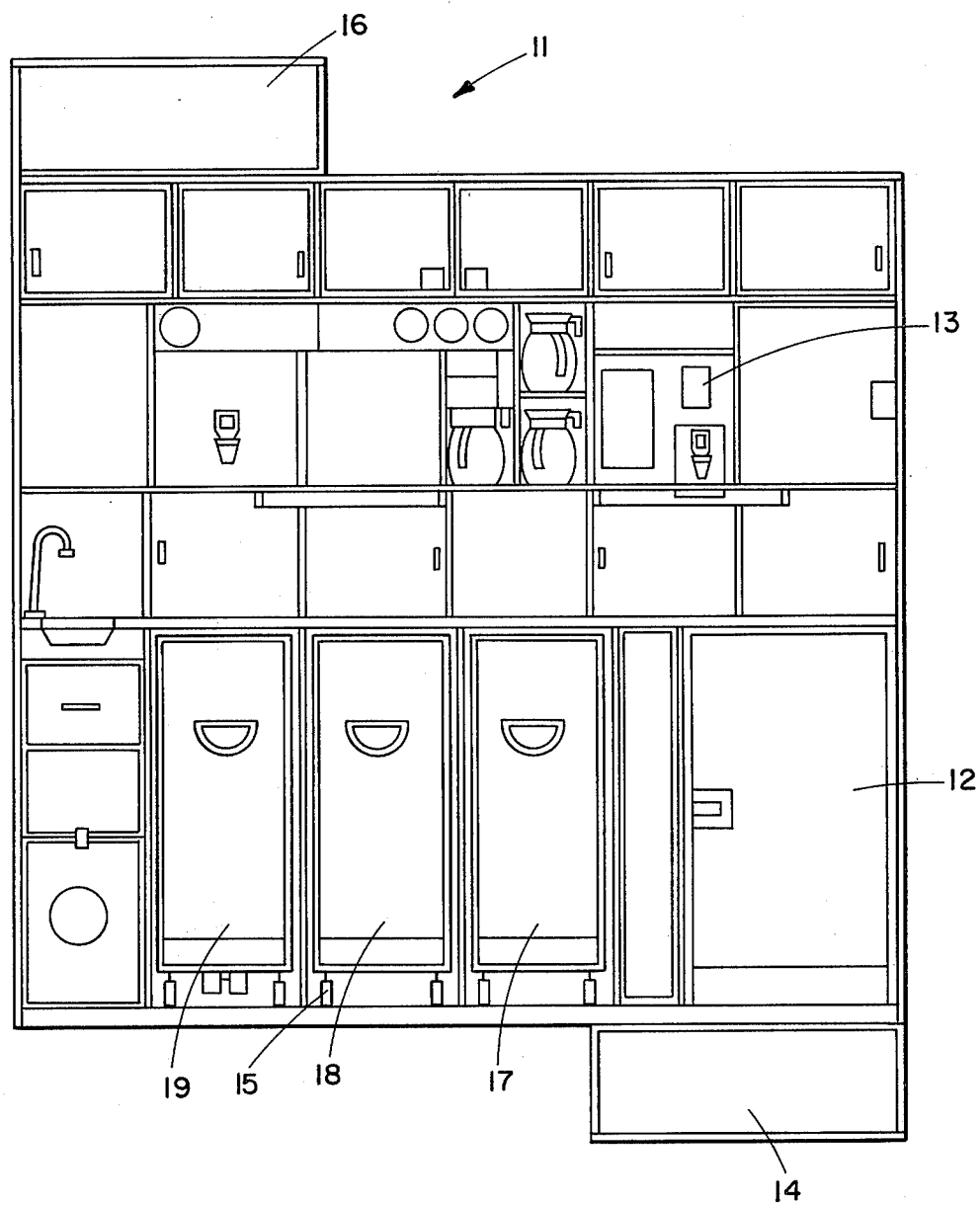
FIG. 1 is a front view of a typical prior aircraft galley in which the invention finds utility.

Reference is now made to FIG. 1 which illustrates a front view of a typical galley section found in a commercial aircraft. It should be apparent from the brief description that follows that the galley is a highly compact configuration typically providing storage for food service to handle a 100 or more passengers on the aircraft. Included in the aircraft galley 11 are such items as a refrigerated/freezer 12, a drinking water cooler 13 and air chillers 14 and 16. The illustration in FIG. 1 is that of a prior art aircraft galley 11 in which the invention finds utility. The air chillers 14 and 16 simultaneously provide for cooling of galley food and beverage cart compartments and various foods storage areas. These air chillers 14 and 16 are connected by duct work to the required galley areas. The duct work is not shown in this illustration. Portable food storage units in the form of carts 17, 18 and 19 are provided. These carts 17, 18 and 19 are mounted on wheels as shown and are routinely filled with food and beverage at a point remote from the aircraft, and delivered to the aircraft for storage in the places shown. The carts 17, 18 and 19 are rolled into place on wheels 15. The invention to be described more fully hereinafter will allow for the removal of at least one of the air chillers 14, 16 and its associated duct work.

Figure 2:
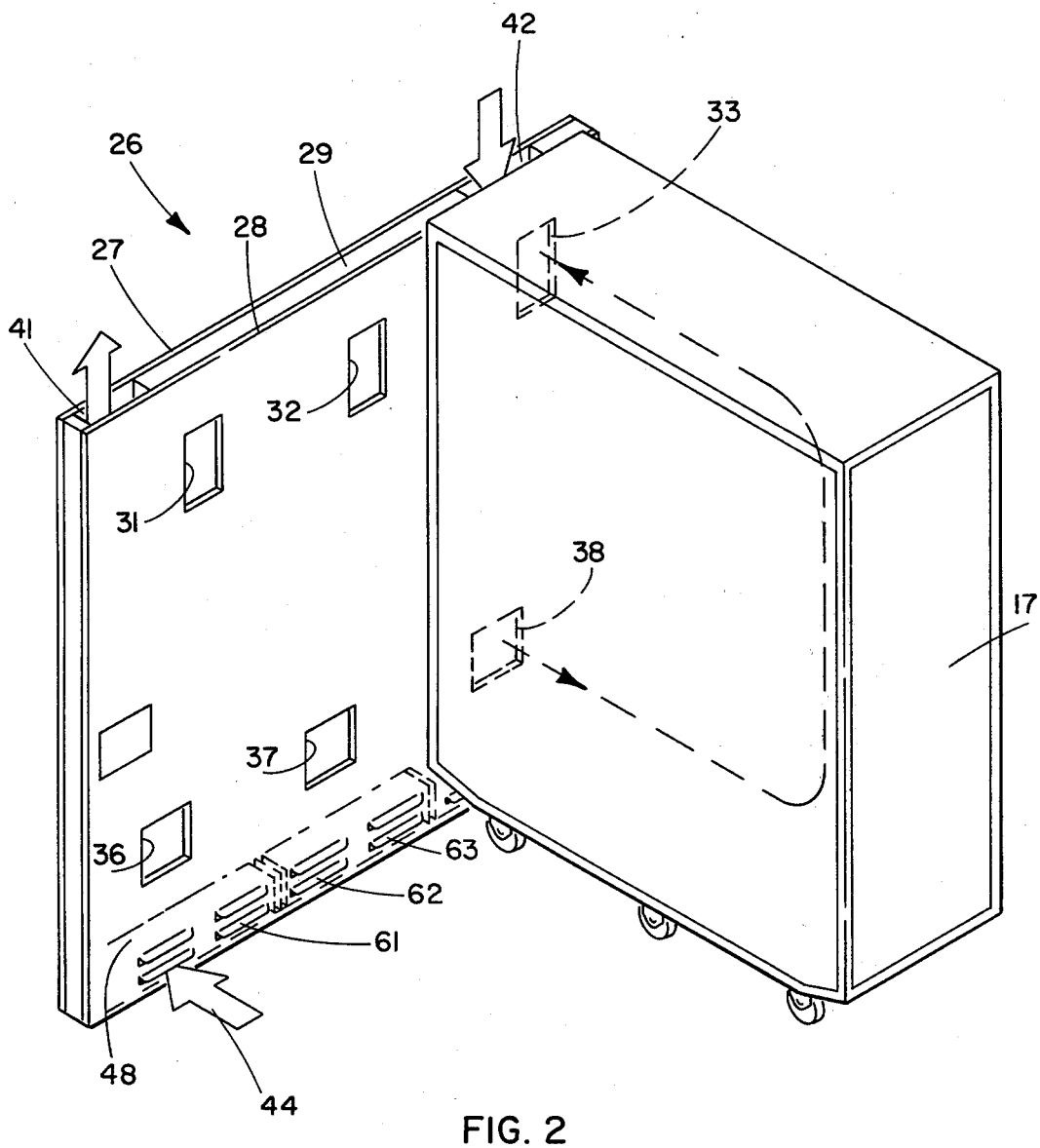
FIG. 2 is a three dimensional illustration of a portable food storage unit shown in an operative position in respect of a panel air chiller that embodies the invention.

Reference is now made to FIG. 2 which is a three dimensional showing of a portable food storage cart 17 cooperatively disposed adjacent the panel air chiller 26 containing the invention. It is to be understood that the panel air chiller 26 is fitted behind the carts 17, 18 and 19, as these carts are illustrated in FIG. 1. In FIG. 2, a single cart 17 is shown having a pair of openings in communication with an air return opening 33 and an air supply opening 38. The manner in which refrigerated air is delivered to air supply opening 38 and drawn back through air return opening 33 will be explained more fully hereinafter.

The panel air chiller 26 includes first and second spaced apart parallel panels 27, 28. The panels 27, 28 may be fashioned of any suitable rigid material. Solid foam insulation 29 is shown filling the space between panel 27 and panel 28. The foam insulation 29 is rigid and provides a thermal insulation barrier, the utility of which will be described more fully hereinafter. Across the face of panel 28 are a plurality of air return openings 31, 32 and 33. Across the bottom of the face of the panel 28 are a plurality of air supply openings 36, 37 and 38. At the bottom of the panel air chiller 26 shown in dotted outline is a condenser 48. The panel 28 has formed at the base thereof a plurality of louvered openings 61, 62 and 63. The louvered openings 61, 62 and 63 allow air into and past the condenser 48 as shown by air direction arrow 44. At the top of the panel air chiller 26 there is shown an air supply opening 41 that communicates to other regions in the galley. An air return opening 42 is provided to receive return air from other regions of the galley.

Figure 3:
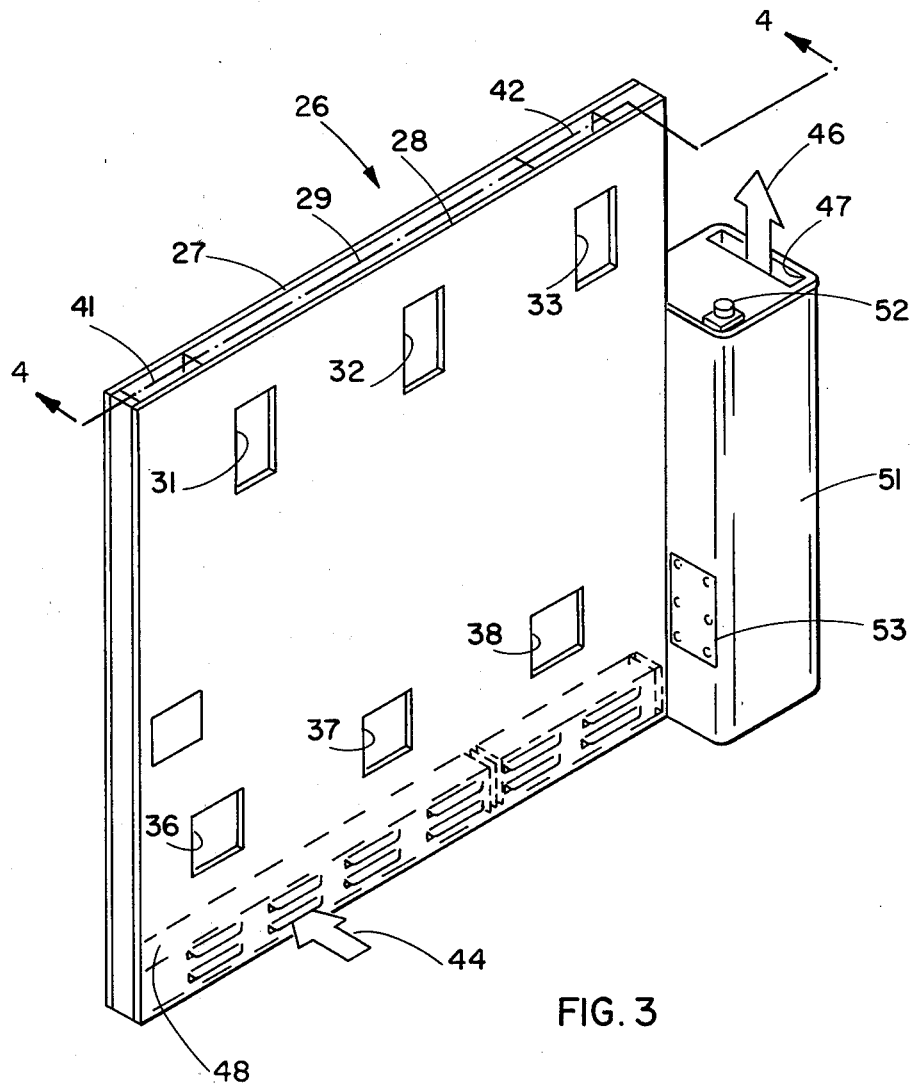
FIG. 3 is a three dimensional illustration of a preferred embodiment of a panel air chiller embodying the invention.
Figure 5:
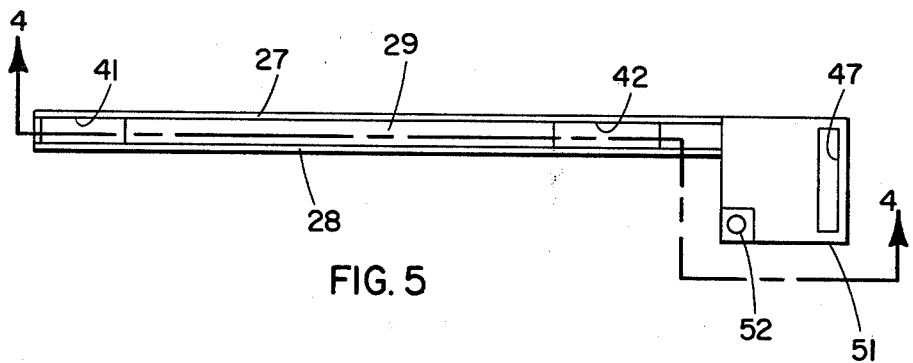
FIG. 5 is a top view of FIG. 3.
Figure 4:
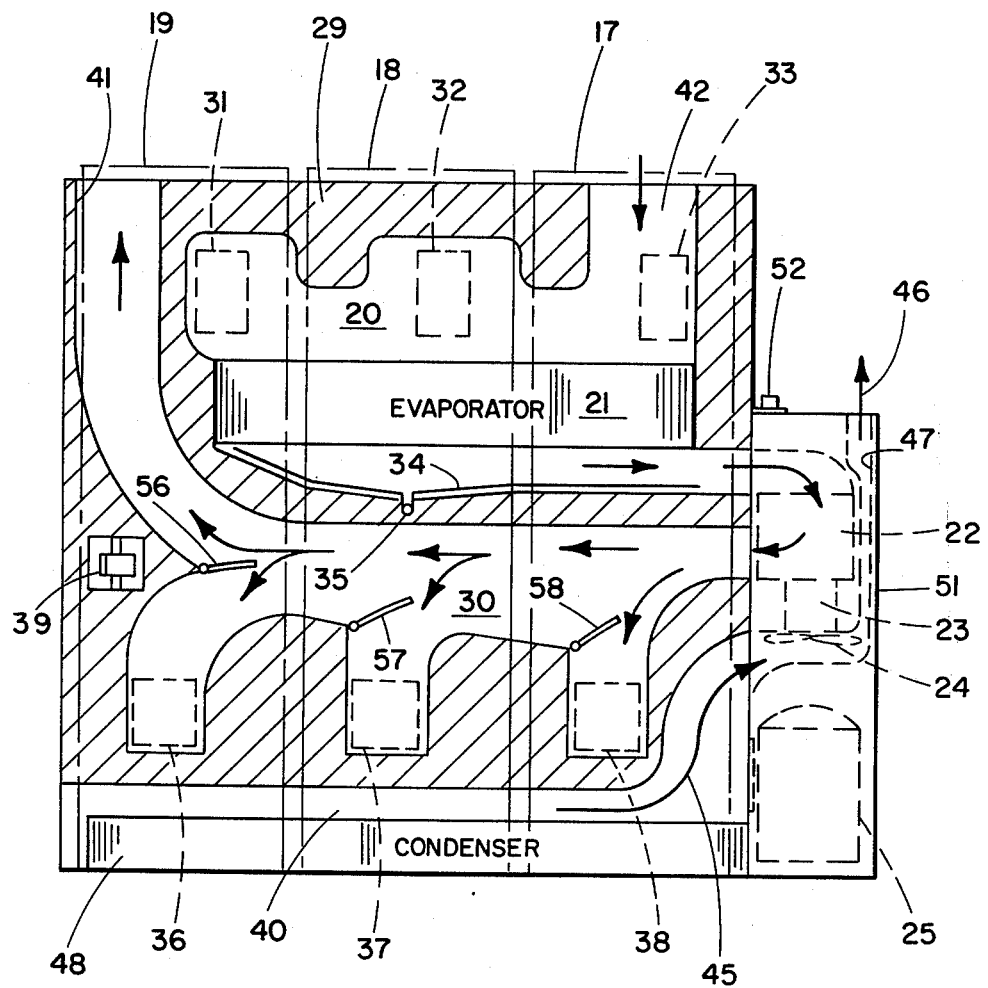
FIG. 4 is a partial sectional view taken along the line 4—4 in FIG. 5.

Reference is now made to FIG. 3 and this figure illustrates the panel air chiller 26 with the portable storage cart 17 removed. In FIG. 3, there is shown a refrigeration equipment housing 51 disposed to the right of the panel air chiller 26. The refrigeration equipment housing 51 is secured to the panel air chiller by fastening means not shown. At the top of the housing 51 there is illustrated an electrical plug or connection 52 which would be connected to a power supply cable not shown. A control panel 53 is schematically shown illustrated on the side of housing 51 adjacent panel 28. An air direction arrow 46 is shown emerging from an air discharge opening 47. In the explanation of FIG. 4, it will be understood that air entering along the floor as shown by arrow 44 will enter the louvered openings 61 and thereafter emerge as shown by arrow 46.

Reference is now made to FIG. 4 which represents a front view taken along the lines 4—4 of FIG. 3. In FIG. 4, the rigid thermal foam insulation 29 is shown formed in place and has been designated with cross hatching. The rigid foam insulation 29 has been formed to provide a first chamber 20, a second chamber 30 and a third chamber 40. The outlines of these chambers 20, 30 and 40 form passages between the panels 27, 28 through which air is circulated.

Figure 6:
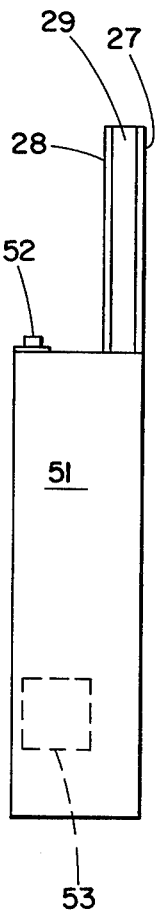
FIG. 6 is a side view of FIG. 3.

There is shown superimposed on FIG. 4 in dotted outline, the air return openings 31, 32 and 33 as well as the air supply openings 36, 37 and 38. Also superimposed on FIG. 4 shown in broken and dotted outline are the outlines of portable food storage carts 17, 18 and 19. Sandwiched between the panels 27 and 28 is an evaporator 21 and beneath the evaporator 21 there is positioned a condenser drain pan 34 and drain pan tube 35. It is to be understood that the refrigeration system is conventional in that the components themselves are not new. However, the panel air chiller 26 represents an innovative departure from the manner in which the prior art has assembled air chilling arrangements. Between the panels 27 and 28 disposed as shown, are an evaporator 21, condenser 48 and expansion valve 39. The connections between these just innumerated refrigeration components is not shown, as the connections do not form a part of the subject invention. The refrigeration equipment housing 51 has shown in dotted outline therein, an evaporator fan 22 which draws air from the first chamber 20 through the evaporator 21 where it is cooled. The fan 22 delivers the refrigerated air as indicated by the arrows to the second chamber 30 where the chilled air exits via the air supply openings 36, 37 and 38. A plurality of trim tabs 56, 57 and 58 are positioned as shown to direct the refrigerated air through the air supply openings 36, 37 and 38. The trim tabs 56, 57 and 58 are pivotally mounted for adjustment by means not shown. In FIG. 4, it can also be seen that refrigerated air is not only delivered to and through the openings 36, 37 and 38, but upwardly through galley air supply opening 41. The first chamber 20 is provided with the galley return opening 42, mentioned heretofore. The refrigeration equipment housing 51 also includes a fan motor 23, which fan motor simultaneously drives a condenser fan 24 and evaporator fan 22. The condenser fan 24 acts to draw air in through the louvered openings 61, 62 and 63 as shown in FIGS. 2 and 3, and delivers the same as designated by arrow 45 through the duct shown in dotted outline in housing 51, and thence out the air discharge opening 47 as evidenced by the arrow 46. A compressor 25 shown in dotted outline is located at the base of the refrigeration equipment housing 51. FIG. 6 is an end view of the panel air chiller 26 and details in this illustration the highly compact nature of the panel air chiller 26.

The panel air chiller 26 because of its unique configuration may easily be retrofitted into aircraft galleys where heretofore cooling of the portable storage compartments had been accomplished by dry ice or the ducting of chilled air from air chillers 14, 16, such as those shown in FIG. 1.

From the foregoing it can be seen that the invention provides an air chiller that includes air distribution ducting, as well as heat exchangers in a flat panel configuration that cooperates with portable food storage carts and utilizes only the space normally occupied by ducting in prior art galleys.

It should also be evident that the invention provides an air chiller with a refrigerant compressor and fan assembly permanently altered to one end of the panel air chiller to thereby create a self-contained, readily removable air chiller, air distribution unit for modular installation in aircraft galleys.

In conclusion, the invention heretofore described clearly evidences an air chiller and distribution system that reduces air leakage potential inherent in prior art air chiller systems for use in aircraft galleys, as well as greatly reducing the heat conduction losses through galley ducts by utilizing a single panel that contains all the ducting, and a heat exchanger integrally disposed within the panel.

Although this invention has been illustrated and described in connection with the particular embodiment illustrated, it will be apparent to those skilled in the art that various changes may be made therein without departing from the spirit of the invention as set forth in the appended claims.

I claim:

1. A panel air chiller for use with a portable storage unit of the type that carries items to be cooled, said panel air chiller including in combination:
    first and second spaced apart parallel panels,
    thermal insulation disposed between and in contact with said panels,
    said thermal insulation material having formed therein at least a first and a second chamber between said panels thereby establishing passages between said panels and through said thermal insulation material,
    said first chamber including means to extract heat from air passing thereover to thereby cool said air and at least one return air opening through one of said panels to communicate with said portable storage unit, and
    a fan means coupled to the space between said panels and to said first chamber to thereby draw air through said return air opening and past said means to extract heat from said air and to deliver air cooled by said means to extract heat to and through said second chamber to at least one cool air supply opening, said cool air supply opening adapted for coupling to said portable storage unit.

2. The panel air chiller of claim 1 wherein said means to extract heat from air includes an evaporator heat exchanger coupled to a refrigeration means external to said panel.

3. The panel air chiller of claim 2 wherein said first chamber includes means positioned adjacent said evaporator heat exchanger to collect condensate that may form on said evaporator heat exchanger.

4. The panel air chiller of claim 1 wherein said second chamber includes means to control distribution of cooled air to said cool air supply opening.

5. The panel air chiller of claim 3 wherein there are provided a plurality of return air openings through said one of said panels to thereby communicate with said portable storage unit.

6. The panel air chiller of claim 4 wherein said cool air supply opening is located in said one panel that said return air supply opening is located.

7. The panel air chiller of claim 6 wherein there are provided a plurality of cool air supply openings in said one panel, said cool air supply openings in communication with said second chamber and said portable storage unit.

8. The panel air chiller of claim 7 wherein said means to control distribution of cooled air includes a trim tab for each one of said plurality of said cool air supply openings.

9. The panel air chiller of claim 8 wherein said first chamber includes a remote region return air opening passing through said thermal insulation material and between said panels to thereby return air from a remote region, and
    said second chamber including a remote region air supply opening passing through said thermal insulation material and between said panels to thereby deliver cooled air to said remote region.

10. The panel air chiller of claim 1 wherein there is included a third chamber between said panels that communicates with a condenser heat exchanger having a thickness no greater than the total thickness of said spaced apart parallel panels,
    said third chamber in further communication with a means to move conditioned air over said condenser heat exchanger and discharge the same away from said panel air chiller.

* * * * *